US012727066B2

(12) United States Patent
Upton et al.

(10) Patent No.: US 12,727,066 B2
(45) Date of Patent: Sep. 1, 2026

(54) MEASURING AND CONTROLLING HUMAN CENTRIC TUNABLE WHITE LIGHTS

(71) Applicant: Mate, LLC, Oklahoma City, OK (US)

(72) Inventors: Jon Daniel Upton, Oklahoma City, OK (US); Jennifer Upton, Oklahoma City, OK (US); Christian Ratcliffe, Newcastle, OK (US); Brandon Lambert, Yukon, OK (US); Elton Ledbetter, Moore, OK (US)

(*) Notice: Subject to any disclaimer, the term of this patent is extended or adjusted under 35 U.S.C. 154(b) by 0 days.

(21) Appl. No.: 18/806,536

(22) Filed: Aug. 15, 2024

(65) Prior Publication Data

US 2025/0380345 A1 Dec. 11, 2025

Related U.S. Application Data

(60) Provisional application No. 63/532,693, filed on Aug. 15, 2023.

(51) Int. Cl.
*H05B 45/20* (2020.01)
*H05B 45/24* (2020.01)

(52) U.S. Cl.
CPC .................................... *H05B 45/24* (2020.01)

(58) Field of Classification Search
CPC ........ H05B 45/00; H05B 45/20; H05B 45/24; H05B 45/50; H05B 47/00; H05B 47/10; H05B 47/105; H05B 47/20
See application file for complete search history.

(56) References Cited

U.S. PATENT DOCUMENTS

| | | | |
|---|---|---|---|
| 5,640,061 | A | 6/1997 | Bornhorst et al. |
| 7,348,949 | B2 | 3/2008 | Lee et al. |
| 7,490,957 | B2 | 2/2009 | Leong et al. |
| 7,687,753 | B2 | 3/2010 | Ashdown |
| 7,902,769 | B2 | 3/2011 | Shteynberg et al. |
| 8,299,987 | B2 | 10/2012 | Neudorf et al. |
| 8,330,373 | B2 | 12/2012 | Ramer et al. |
| 8,337,031 | B2 | 12/2012 | Wegh et al. |
| 8,517,550 | B2 | 8/2013 | Ramer et al. |
| 8,525,446 | B2 | 9/2013 | Tikkanen et al. |
| 8,866,414 | B2 | 10/2014 | Maxik et al. |
| 8,926,133 | B2 | 1/2015 | Booth |

(Continued)

FOREIGN PATENT DOCUMENTS

| | | | |
|---|---|---|---|
| CA | 2913239 | A1 | 12/2014 |
| WO | 2003067934 | A2 | 8/2003 |

(Continued)

*Primary Examiner* — Thai Pham

(74) *Attorney, Agent, or Firm* — Young's Patent Services; Bruce A. Young

(57) ABSTRACT

A method of operating a lighting device system. The method comprising the steps of defining a first power signature for a first light fixture based on a first resulting voltage and a first target current of the first light fixture, measuring a second power signature of a second light fixture, comparing the second power signature of the second light fixture to the first power signature of the first light fixture; and determining whether the first light fixture experienced an undesired operating state if the second power signature of the first light fixture deviates from the first power signature of the first light fixture. In one arrangement, the first light fixture is substantially equivalent to the second light fixture.

20 Claims, 5 Drawing Sheets

(56) References Cited

U.S. PATENT DOCUMENTS

| | | | | |
|---|---|---|---|---|
| 8,957,601 | B2 | 2/2015 | Tikkanen et al. | |
| 9,000,934 | B1 * | 4/2015 | Gordin | G08B 13/22 340/669 |
| 9,039,230 | B2 | 5/2015 | Crimi et al. | |
| 9,041,379 | B2 | 5/2015 | Lyons | |
| 9,049,759 | B2 | 6/2015 | Tikkanen et al. | |
| 9,055,622 | B2 | 6/2015 | Aldrich et al. | |
| 9,078,310 | B2 | 7/2015 | Tikkanen et al. | |
| 9,173,273 | B2 | 10/2015 | Zudrell-Koch et al. | |
| 9,320,093 | B2 | 4/2016 | Tikkanen et al. | |
| 9,410,664 | B2 | 8/2016 | Krames et al. | |
| 9,422,053 | B2 | 8/2016 | Himmelmann et al. | |
| 9,591,713 | B2 | 3/2017 | Tikkanen et al. | |
| 9,662,409 | B2 | 5/2017 | Rains, Jr. et al. | |
| 9,775,207 | B2 | 9/2017 | Tikkanen et al. | |
| 9,942,954 | B2 | 4/2018 | Neudorf et al. | |
| 10,045,421 | B2 | 8/2018 | Tikkanen et al. | |
| 10,076,016 | B2 | 9/2018 | Tikkanen et al. | |
| 10,187,946 | B2 | 1/2019 | Tikkanen et al. | |
| 10,237,945 | B2 | 3/2019 | Sooch et al. | |
| 10,299,441 | B2 | 5/2019 | Van Elmpt et al. | |
| 10,362,655 | B2 | 7/2019 | Heim et al. | |
| 10,368,811 | B1 | 8/2019 | Bajaj et al. | |
| 10,582,596 | B2 | 3/2020 | Sooch et al. | |
| 10,621,836 | B2 | 4/2020 | Sooch et al. | |
| 10,757,791 | B1 | 8/2020 | Jonsson | |
| 2005/0162101 | A1 | 7/2005 | Leong et al. | |
| 2006/0022214 | A1 | 2/2006 | Morgan et al. | |
| 2006/0125770 | A1 | 6/2006 | Kao et al. | |
| 2007/0267984 | A1 | 11/2007 | Peng | |
| 2008/0191642 | A1 | 8/2008 | Slot et al. | |
| 2008/0251690 | A1 | 10/2008 | Keiper et al. | |
| 2011/0204820 | A1 | 8/2011 | Tikkanen et al. | |
| 2012/0007512 | A1 | 1/2012 | Kim et al. | |
| 2012/0119658 | A1 | 5/2012 | McDaniel | |
| 2012/0323394 | A1 | 12/2012 | Gandhi | |
| 2013/0063047 | A1 | 3/2013 | Veskovic | |
| 2013/0093362 | A1 | 4/2013 | Edwards | |
| 2013/0218030 | A1 | 8/2013 | Barroso et al. | |
| 2014/0103804 | A1 | 4/2014 | Zhdanau et al. | |
| 2015/0097484 | A1 | 4/2015 | Lee et al. | |
| 2016/0128144 | A1 | 5/2016 | Tikkanen et al. | |
| 2016/0158486 | A1 | 6/2016 | Colbaugh et al. | |
| 2016/0227616 | A1 * | 8/2016 | Lee | H05B 47/105 |
| 2016/0262221 | A1 * | 9/2016 | Nishioka | G01R 31/44 |
| 2017/0025028 | A1 | 1/2017 | Hrushesky | |
| 2017/0105265 | A1 | 4/2017 | Sadwick | |
| 2017/0127497 | A1 | 5/2017 | Baek et al. | |
| 2017/0132946 | A1 | 5/2017 | Kinnunen et al. | |
| 2017/0332462 | A1 | 11/2017 | Tikkanen | |
| 2018/0116033 | A1 * | 4/2018 | Mohan | G01R 31/44 |
| 2018/0318602 | A1 | 11/2018 | Ciccarelli et al. | |
| 2019/0183415 | A1 | 6/2019 | Rytky et al. | |
| 2019/0216391 | A1 | 7/2019 | Kenyon et al. | |
| 2019/0279482 | A1 | 9/2019 | Kaplan et al. | |
| 2020/0068680 | A1 | 2/2020 | Neudorf et al. | |
| 2024/0215132 | A1 * | 6/2024 | Snook | H05B 47/115 |

FOREIGN PATENT DOCUMENTS

| | | | |
|---|---|---|---|
| WO | 2010031169 | A1 | 3/2010 |
| WO | 2016067028 | A2 | 5/2016 |
| WO | 2018220087 | A1 | 12/2018 |
| WO | 2019141904 | A1 | 7/2019 |

* cited by examiner

The properly functioning fixture demonstrates an expected power curve and current draw.

The properly malfunctioning fixture demonstrates an unexpected power curve and reduced current draw.

MEASURING AND CONTROLLING HUMAN CENTRIC TUNABLE WHITE LIGHTS

PRIORITY CLAIM

This non-provisional patent application claims the benefit of U.S. Provisional Application No. 63/525,693 filed on Aug. 15, 2023, the entirety of which is incorporated herein by reference.

FIELD

The present disclosure relates to circadian lighting. More specifically, the present disclosure relates to a system and method for measuring and controlling human centric tunable white lights. The present disclosure also provides a system for measuring tunable white light fixtures and using these fixtures in a circadian lighting system.

The present disclosure also generally relates to lighting systems, and more particularly, to methods and systems for detecting and reporting the failure or malfunction of LED fixtures in a lighting system. The disclosure provides a method for identifying the signature of a failed or malfunctioning LED fixture, determining that a connected fixture has failed based on these characteristics, and reporting that failure to a building management system or user. The systems and methods disclosed herein enhance the functionality of lighting systems by enabling proactive maintenance and improving the reliability of lighting in various settings such as commercial buildings, residential homes, and industrial facilities.

BACKGROUND

Some tunable white light fixtures are becoming increasingly popular in the lighting industry. These fixtures allow users to adjust the color temperature of the light output in order to achieve the desired ambiance or functionality. For example, in the case of circadian lighting systems, the color temperature of the light output can be adjusted to mimic the properties of the sunlight at different times throughout the day.

However, achieving the desired brightness while at the same time of achieving the desired color temperature can be a challenging task as it requires control over both the warm and cool channels of the tunable white light fixture. In addition, controlling the light output over time, such as in the case of a circadian scene, can be a complex process that requires careful planning and execution.

There is therefore a general need for systems and methods that provide the desired brightness and color temperature that can be properly controlled and regulated. The desired brightness and color temperature should be controlled and regulated over certain lengthy periods of time, for example, over hours or days of the week.

Moreover, lighting systems, particularly those using LED fixtures, are widely used in various settings including commercial buildings, residential homes, and industrial facilities. These systems provide illumination that is essential for various activities and operations. However, the failure or malfunction of an LED fixture in these systems can lead to inadequate lighting conditions, which can affect productivity, safety, and comfort.

Traditional methods of detecting a failed or malfunctioning LED fixture often involves manual inspection, which can be time-consuming and inefficient. Furthermore, these methods typically do not provide advance warning before a fixture fails, leading to unexpected periods of inadequate lighting.

Some existing systems attempt to monitor the performance of LED fixtures by measuring parameters such as power consumption or light output. However, these methods can be inaccurate as they may be affected by various factors unrelated to the health of the fixture, such as fluctuations in power supply or ambient lighting conditions.

Therefore, there is also a general need for a reliable and efficient method of detecting and reporting the failure or malfunction of LED fixtures in a lighting system. As just one example, such a method would be able to identify the signature of a failed or malfunctioning fixture, determine that a connected fixture has failed based on these characteristics, and report that failure to a building management system or user. This would enable proactive maintenance and improve the reliability of lighting systems.

SUMMARY

According to an exemplary arrangement, a method of operating a lighting device system comprises the steps of defining a first power signature for a first light fixture based on a first resulting voltage and a first target current of the first light fixture; measuring a second power signature of a second light fixture; comparing the second power signature of the second light fixture to the first power signature of the first light fixture; and determining whether the first light fixture experienced an undesired operating state if the second power signature of the first light fixture deviates from the first power signature of the first light fixture.

According to an exemplary arrangement, the first light fixture is substantially equivalent to the second light fixture.

According to an exemplary arrangement, the method further comprising the steps of applying power to the first light fixture; measuring a first voltage and a first current of the first light fixture; and recording the first resulting voltage once the first current of the first light fixture substantially achieves the target current.

According to an exemplary arrangement, the method further comprising the step of reporting the undesired operating state of the first light fixture.

According to an exemplary arrangement, the method further comprising the step of reporting the undesired operating state of the first light fixture to a building management system.

According to an exemplary arrangement, the method further comprising the step of reporting the undesired operating state of the first light fixture to a user.

According to an exemplary arrangement, the method further comprising the step of providing a first lighting profile for the first light fixture, wherein the first lighting profile of the first light fixture is based on a brightness requirement and a CCT requirement of the first light fixture.

According to an exemplary arrangement, the method further comprising the step of applying the first lighting profile of the first light fixture to the second light fixture, if the second power signature is substantially similar to the first power signature.

According to an exemplary arrangement, the undesired operating state comprises a failure of the first light fixture.

According to an exemplary arrangement, the undesired operating state comprises a malfunction of the first light fixture.

According to an exemplary arrangement, the first power signature comprises a unique characteristic used to identify the first light fixture and monitor its performance.

According to an exemplary arrangement, the undesired operating state of the first light fixture is reported by sending a notification via a network.

According to an exemplary arrangement, the undesired operating state of the first light fixture is reported by displaying a warning on a user interface.

According to an exemplary arrangement, the undesired operating state of the first light fixture is reported by triggering an alarm.

According to an exemplary arrangement, the first power signature is stored in a searchable memory device.

According to an exemplary arrangement, the method further comprising the step of identifying the first light fixture based on the first power signature.

According to an exemplary arrangement, the method further comprising the step of measuring a brightness and a color temperature property of a warm channel and a cool channel of the first light fixture.

According to an exemplary arrangement, the method further comprising the step of creating a first lighting profile comprising a plurality of power settings required to mix an output of the warm channel and the cool channel of the first light fixture to produce light of a desired brightness based on the measured brightness and a desired CCT based on the measured CCT.

According to an exemplary arrangement, the method further comprising the step of controlling a power level provided to the first light fixture based on the first lighting profile.

According to an exemplary arrangement, the step of applying the first lighting profile to the first light fixture comprises the step of adjusting a color temperature and adjusting a brightness of a light output of the first light fixture.

According to an exemplary arrangement, the step of adjusting the color temperature and adjusting the brightness of the light output of the first light fixture comprises the step of adjusting the color temperature and adjusting the brightness of the light output of the first light fixture according to an active scene.

According to an exemplary arrangement, the active scene comprises a circadian scene comprising varying power levels throughout a time period.

According to an exemplary arrangement, the active scene comprises a dynamic scene.

According to an exemplary arrangement, the step of adjusting the color temperature and adjusting the brightness of the light output of the first light fixture comprises the step of adjusting the color temperature and adjusting the brightness of the light output of the first light fixture according to a user input.

According to an exemplary arrangement, the step of applying power to the first light fixture comprises the step of incrementally applying power to the first light fixture.

According to an exemplary arrangement, the first targeted current comprises about one milliamp.

According to an exemplary arrangement, the first light fixture comprises a tunable white light fixture.

According to an exemplary arrangement, the tunable white light fixture comprises at least one channel of a cool white LED and at least one channel of a warm white LED.

According to an exemplary arrangement, the lighting system comprises a circadian lighting system.

According to an exemplary arrangement, the method further comprising the step of providing the first lighting profile to a lighting controller comprising a plurality of power outputs, wherein the lighting controller utilizes the first lighting profile to produce light of predetermined brightness and of predetermined CCT.

According to an exemplary arrangement, the lighting device controller is configured to accept a user input to adjust the predetermined brightness and the predetermined CCT of an active scene.

According to an exemplary arrangement, the method further comprising the step of delivering power to the first light fixture from a DC power source.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of one or more illustrative embodiments of the present disclosure when read in conjunction with the accompanying drawings, wherein:

DETAILED DESCRIPTION

Figure 1:
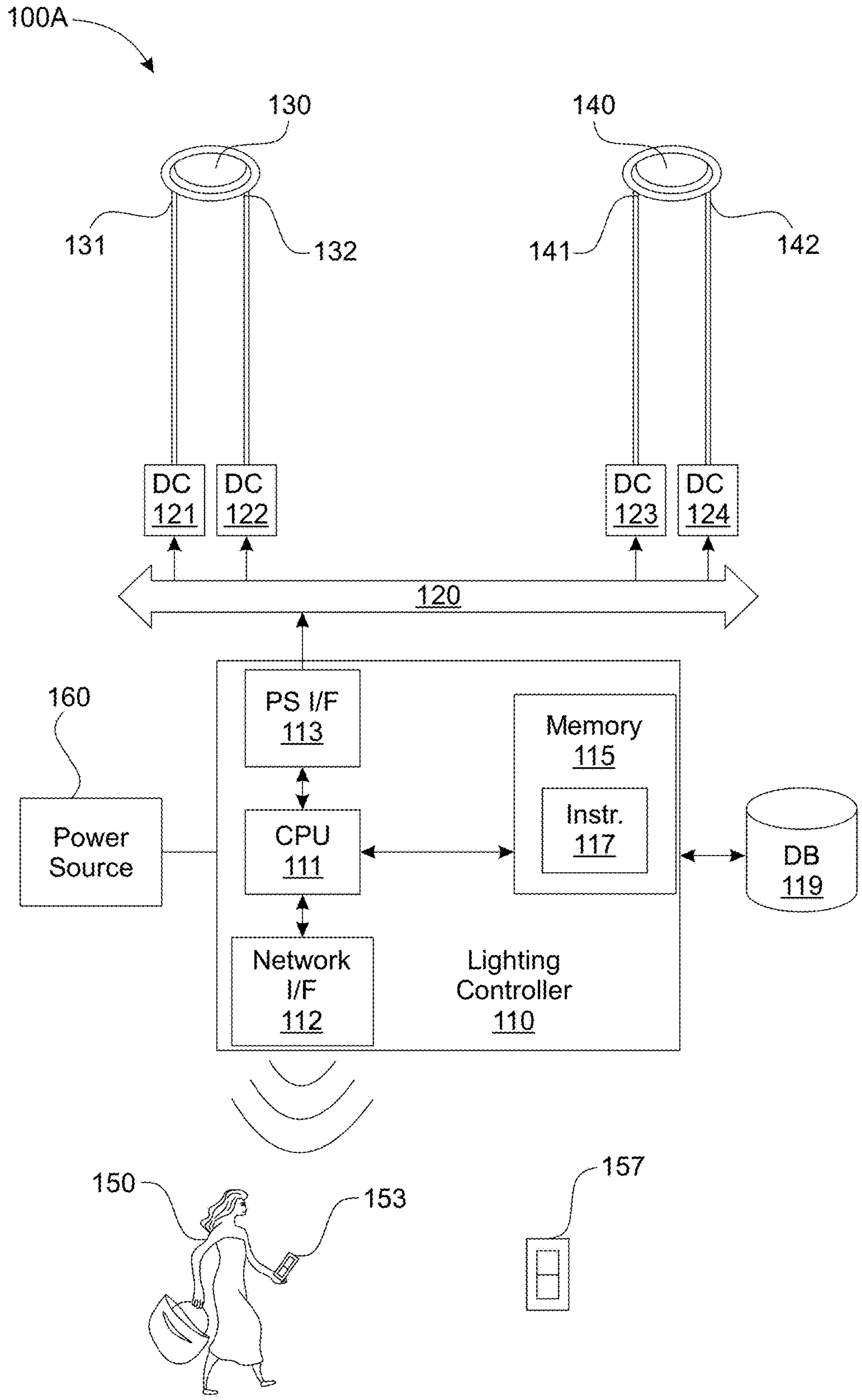
FIG. 1 illustrates a block diagram of an embodiment of a lighting system incorporating aspects of the present disclosure.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present disclosure relates to systems and methods for measuring, controlling, and/or monitoring tunable white light fixtures in order to produce light of predetermined brightness and color temperature. The system includes at least one tunable white light fixture, a device with multiple power outputs (e.g., a lighting controller), and a circadian scene that mimics the properties of the sun's light at predetermined times throughout the day. The system further incorporates the measurement of voltage and current during the creation of the profile, creating a unique power signature for each light fixture. The power signature is then used by the lighting controller device to determine the connected fixture and utilize its corresponding profile during operation. In addition, the power signature can also then be used by the lighting controller device to monitor the connected fixture. That is, in one arrangement, the lighting controller can determine an operational state of the connected fixture, such as whether the fixture is non-operational or if its operating performance has degraded to a certain undesired state.

In one aspect, the present disclosure relates to a system for measuring, controlling and/or monitoring human centric tunable white lights. More specifically, the present disclosure provides a system for profiling tunable white light fixtures, measuring voltage and current during profile creation, and utilizing the power signature of each fixture to determine its profile and control and/or monitor the power levels according to the active scene during operation.

Tunable white light fixtures offer users the ability to adjust the color temperature and brightness of the light output to suit their preferences and needs. However, accurately identifying the connected fixture and utilizing the corresponding profile during operation can be challenging.

The present disclosure provides systems and methods for measuring, controlling and/or monitoring tunable white light fixtures. In addition to the existing features, the present disclosure incorporates the use of a power signature to determine the connected fixture and utilize and monitor its corresponding profile during operation.

In one preferred arrangement, a tunable white light fixture comprises a type of lighting system that allows users to adjust the color temperature of the light output. In one preferred arrangement, the tunable white light fixture comprises a Human Centric Lighting fixture (HCL). As an example, such a fixture is defined by Lighting Europe as a type of lighting that "supports the health, wellbeing and performance of humans by combining visual, biological and emotional benefits of light." This is achieved by dimming and a change in Correlated Color Temperature (CCT) of a smart light source (most likely an LED), to mimic the appropriate levels of irradiance and spectrum of sunlight throughout the day.

Light sources may be classified by the color appearance of the light wavelengths they produce, which may be referred to as the Correlated Color Temperature (or simply, Color Temperature) of the light wavelengths. The Correlated Color Temperature is a measure of how "cool" or "warm" the light wavelengths appear to the human eye and may be measured in degrees Kelvin (K, a unit of thermodynamic temperature, equal in magnitude to a degree Celsius).

The Color Temperature of a light source may be technically defined as the temperature of an ideal black-body radiator that radiates light of a color comparable to that of the light source. Typically, the cooler the light wavelengths appear, the higher the Correlated Color Temperature. The warmer the light wavelengths appear, the lower the Correlated Color Temperature.

This type of fixture typically uses a smart light source. In one preferred arrangement, the smart light source comprises LED (Light Emitting Diode) technology that can produce a wide range of color temperatures, from warm white (2700K) to cool white (6500K) or even daylight white (up to 9000K).

Unlike traditional light fixtures, which emit a fixed color temperature, tunable white light fixtures allow users to adjust the color temperature of the light output to suit specific needs and preferences. For example, a tunable white light fixture can be set to emit warm white light in the evening to create a cozy and relaxing atmosphere. The tunable white light fixture can then be adjusted to emit cool white light during the day to increase focus and productivity.

The tunable white light fixtures described in the present disclosure can be controlled through a variety of methods. Such controlling methods may include but are not limited to mobile applications, remote controls, or wall-mounted switches. In one preferred arrangement, the disclosed tunable white light fixtures are operationally configured or equipped with timing and/or light sensors that can automatically adjust the color temperature based on the time of day, a user desired light input, and/or ambient light levels.

In addition to adjusting the color temperature, some tunable white light fixtures also allow users to adjust the brightness of the light output. This can be particularly useful in settings where different lighting levels are required at different times of day or for different tasks. The brightness of light is typically measured as light output in lumens. The higher the lumens of a light source, the greater the light output, and the brighter the light. A lumen is a unit of luminous flux in the International System of Units that is equal to the amount of light given out through a solid angle by a source of one candela intensity radiating equally in all directions.

The tunable white light fixture arrangements and systems as disclosed herein can be used in a variety of settings, including residential, commercial, and industrial applications. In residential settings, tunable white lighting can be used to create different moods and ambiance in different rooms, such as warm lighting in a living room and cool lighting in a kitchen. In commercial settings, tunable white lighting systems and methods can be used to enhance productivity and promote well-being in workplaces. These lighting systems and methods may also be utilized in industrial settings, where these tunable white lighting systems and methods can improve safety and visibility for workers. Overall, tunable white light fixtures offer a versatile and customizable lighting solution that can improve the quality of light and enhance the environment of a space.

Tunable white light fixtures that allow for both brightness and color temperature to be adjusted typically use a combination of control methods to achieve this. As just one example arrangement, to adjust brightness, the presently disclosed lighting controller adjusts the current flowing through the LEDs in the tunable fixture. To adjust color temperature, the lighting controller adjusts the relative brightness of the cool and warm white LEDs in the tunable fixture.

One way to achieve both brightness (i.e., current control) and color temperature control (i.e., cool and warm brightness control) is to use multiple channels of LEDs. For example, in one preferred arrangement, a tunable fixture comprises at least one channel of cool white LEDs and at least one channel of warm white LEDs. The lighting controller can then adjust the current flowing through each channel to adjust the overall brightness. In addition, the lighting controller can also at the same time adjust the relative brightness of the cool and warm white LEDs to adjust the color temperature.

For example, tunable white light fixtures that use multiple channels of LEDs allow for both brightness and color temperature control by independently adjusting the current flowing through each channel of LEDs.

In a tunable white light fixture with multiple channels of LEDs, each channel contains a different color temperature of LED. For example, there may be one channel of cool white LEDs and one channel of warm white LEDs. As those of ordinary skill in the art will recognize, the number of channels can vary depending on the specific fixture and manufacturer.

To adjust brightness, the lighting controller adjusts the current flowing through each channel of LEDs. This allows the fixture to maintain the same color temperature while increasing or decreasing the overall brightness of the light. Then, to adjust color temperature, the lighting controller adjusts the relative brightness of the different channels of LEDs. For example, if the user wants a warmer light, the lighting controller would increase the relative brightness of the warm white LEDs and decrease the relative brightness of the cool white LEDs. Conversely, if the user wants a cooler light, the lighting controller would increase the relative brightness of the cool white LEDs and decrease the relative brightness of the warm white LEDs. By independently controlling the current flowing through each channel of LEDs and adjusting the relative brightness of each channel, tunable white light fixtures with multiple channels of LEDs allow for accurate control over both brightness and color temperature.

In one arrangement, the tunable white light fixtures may comprise RGBW LEDs. As just one example, these LEDs may comprise four separate light producing silicon chips inside: one for red, one for green, one for blue, and one for white. In such an arrangement, the lighting controller may be configured to adjust the relative brightness of each chip, and thereby the lighting controller can create a range of colors and adjust the color temperature. The white chip can also be used to adjust brightness independently of the other colors. In both cases, the lighting controller uses a combination of current and relative brightness adjustments to achieve both brightness and color temperature control.

In one preferred arrangement, the systems and methods as disclosed herein will utilize a tunable white light fixture comprising two separate channels of LEDs—a warm channel and a cool channel. These channels work together to produce a range of color temperatures that can be adjusted according to specific needs and preferences. The warm channel consists of LEDs that emit light at a lower color temperature, typically around 2700K to 3500K. This warm channel produces warm, yellowish light that is similar in color to the light emitted by traditional incandescent bulbs. Warm white light is typically used in settings where a cozy and relaxing atmosphere is desired, such as in living rooms, bedrooms, and restaurants.

The cool channel, on the other hand, consists of LEDs that emit light at a higher color temperature, typically around 5000K to about 6500K or even higher. This cool channel produces cool, bluish-white light that is similar in color to daylight or fluorescent lighting. Cool white light is typically used in settings where high levels of brightness and visibility are required, such as in kitchens, offices, and retail spaces.

When both channels are turned on at the same time, the tunable white light fixture produces a neutral white light that is similar in color to natural daylight. This allows users to achieve a wide range of color temperatures by adjusting the balance between the warm and cool channels.

The tunable white light fixtures as disclosed herein offer a variety of control options to adjust the color temperature and brightness of the light output. These options include mobile applications, remote controls, and wall-mounted switches. In one preferred arrangement, the disclosed tunable white light fixtures may comprise timing, temperature, and/or light sensors that can adjust the color temperature based on the time of day or ambient light levels in real time, as just one example automatically. Overall, the warm and cool channels of a tunable white light fixture work together to produce a versatile lighting solution that can be customized to suit specific needs and preferences.

In one preferred arrangement, the disclosed lighting controller utilizes a profile of the power settings required to mix the output of the warm and cool channels to produce light of a desired brightness along with a desired correlated color temperature (CCT). The presently disclosed systems and methods may also include information for scenes with static brightness and CCT levels and other dynamic scenes that automatically progress as dictated by the user.

The present disclosure provides a system for measuring, controlling, and monitoring tunable white light fixtures in order to produce light of predetermined brightness and color temperature. The system includes a tunable white light fixture, a device (e.g., a lighting controller) comprising a plurality of power outputs, and a circadian scene that mimics the properties of the sun's light at predetermined times throughout the day.

In one aspect, the tunable white light fixture is measured and monitored for the brightness and color temperature properties of the fixture's warm and cool channels. Those properties are used to create a profile of the power settings required to mix the output of the warm and cool channels so as to produce and monitor light of a desired brightness and a desired CCT.

In another aspect, the profile of the power settings is provided to a device (i.e., a lighting controller) with a plurality of power outputs, which uses the profile to produce and monitor light of predetermined brightness and of predetermined CCT. The device may be provided with information for one or more scenes with static brightness and static CCT levels. In addition, the device may be provided with information for a circadian scene. For example, in one arrangement, such a circadian scene may comprise an automatic progression of varying brightness and CCT levels designed to mimic the properties of the sun's light at predetermined times throughout the day.

The system and methods as disclosed herein may also include information for one or more dynamic scenes that are desired by a user, with varying brightness and CCT levels that automatically progress as dictated by the user. The information in the circadian scene may include various set points at predetermined times throughout the day, and the device may calculate the power levels required to transition between those set points at predetermined intervals, such as one minute.

In another aspect, the device may be configured to accept user input to adjust the brightness and/or CCT levels of the active scene. An input may comprise a physical input such as a button or contact closure. In an alternative arrangement, the input may comprise a network communication input. The device may be configured to maintain brightness and/or CCT level variables, the value of which may be increased or decreased by the user input. The value of the brightness and/or CCT variables may be used to adjust the brightness and CCT levels of the active scene, whether static or dynamic, for the duration of the scene.

Conventionally, lighting systems were either single-color or required complex color programming at the source of the fixture or in an analog manner. In accordance with the present disclosure, DC tunable lighting control allows for central power control and central command control for changing light output of one or more light fixtures to match lighting scenes based on solar events or other conditions, such as by assigning CCT and/or brightness, which may be used to maintain and/or correct circadian rhythms. Further, the systems and methods of the present disclosure reduce the complexity for users to set-up such systems by eliminating analog programming and providing user interfaces that provide automatic and/or simplified programming.

For example, a solar event refers to a time, or range of times, that is based on a position of the sun (i.e., a solar position) at a particular location. Examples of solar events include early morning, sunrise, mid-morning, solar noon, afternoon, sunset, evening, astronomical dawn, astronomical twilight, astronomical dusk, nautical dawn, nautical twilight, nautical dusk, civil dawn, civil twilight, civil dusk, night, and daylight. Other solar events may be defined in some embodiments.

Some luminaires (i.e., light fixtures) may require two DC power inputs that respectively drive light sources (e.g., LEDs) in the luminaire. In certain arrangements, such light fixtures depend on external DC power supplies to drive the two DC power inputs. These external DC power supplies may be integrated into a single unit with multiple DC power outputs, or they may be separate devices each having a single DC power output, depending on the embodiment. In an alternative arrangement, a single system may use a plurality of DC power supplies with a plurality of outputs, and others with a single DC power output. As referred to herein, a DC power supply refers to a portion of a device that has a separately controllable DC power output and may refer to an entire stand-alone device or may refer to a portion of a larger device with multiple functions and/or DC power outputs. Therefore, a device having a single DC power output is referred to as a DC power supply, and a device having four separately controllable DC power outputs may be referred to as a first DC power supply, a second DC power supply, a third DC power supply, and a fourth DC power supply.

According to one arrangement, a system according to the present disclosure comprises at least one device acting as one or more DC power supplies and is connected to a power source (see power source 160 FIG. 1), such as an AC power source (e.g., a 120 VAC power output driven from the AC power grid), a battery, a generator, a solar panel, or any other type or combination of types of power sources.

In some embodiments, the DC power supply may provide a set voltage and vary the current based on the number of luminaires (and therefore the number of LEDs) being driven. This may be referred to as a constant voltage (CV) driver. When this approach is used, the luminaires are connected in parallel with each other and the voltage provided by the DC power supply is set based on the specifications of the luminaires. In other embodiments, the DC power supply may provide a set current and vary the voltage based on the number of luminaires (and therefore the number of LEDs) being driven. This may be referred to as a constant current (CC) driver. When this approach is used, the luminaires are connected in series and the current provided by the DC power supply is set based on the specifications of the luminaires. Such luminaires have a power output which can be connected to the next luminaire in the series and a terminator may be used to complete the circuit on the last luminaire in the series.

Brightness of an LED can be controlled by modulating the power delivered by the driver (i.e., the DC power supply) to the LED load. Because LEDs have a non-linear response to voltage, analog modulation of the voltage for dimming is not commonly used with a constant voltage driver. To dim an LED load with a constant voltage driver, the power is commonly modulated using pulse width modulation (PWM) or pulse density modulation (PDM), both of which affect the percentage of a given time period that the voltage is applied to the LED load which digitally modulates the power delivered. The time period is typically chosen to be short enough that most people cannot detect any flickering, such as 16 milliseconds (ms) or less, with the PWM or PDM modulation being performed for each time period. So, for example if a 25% brightness is desired, a PWM system may repeatedly turn the voltage on for 4 ms and then turn off the voltage for 12 ms before turning the voltage back on again and repeating. It should be noted that DC power, as the term is used herein, encompasses a PWM or PDM modulated signal, even if the voltage during the off periods goes negative, as long as substantially all of the power transfer to the LEDs is during the on periods of the PWM/PDM modulation.

While a constant current CC driver can use PWM or PDM to modulate the power delivered to the LED load, a constant current CC driver can dim the LED load by changing the DC current level delivered to the LED load, which is an analog modulation of the power delivered. This technique for dimming an LED has an advantage over PWM and PDM in that it eliminates high frequency flicker from the LEDs that can cause health issues such as migraines. Note that as the current is modulated, the voltage level may vary in a non-linear way due to the characteristics of LEDs.

The DC power supplies, as the phrase is used herein, can use techniques to vary the amount of power delivered at their outputs, including those described above of PWM or PDM with a constant voltage or by regulating (or modulating) the current in an analog manner. The DC power supplies have the ability to communicate with a controller through a communication interface. Various types of communications interface may be used, including, but not limited to, DMX, Ethernet, Wi-Fi, universal serial bus (USB), Digital Addressable Lighting Interface (DALI), or optical communications.

The DC power supplies may be installed with their power outputs coupled to power inputs of one or more luminaires by various types of suitable electrical cable or conductor, including, Romex® NM cable, Ethernet cable (e.g. Cat5 or Cat6 cable), individual multi-stranded or solid insulated wires, a jacketed multi-conductor cable, or another type of cabling. The conductors used should have low-enough resistance to minimize the power lost in the cable (and heat generated) and be insulated to avoid short-circuits with other cables or metal structures. Appropriate regulations such as the Uniform Electrical Code should also be followed in the selection of the cable to use to connect the DC power supplies to the luminaires and in the installation of the lighting system.

In certain arrangements, the first power input of the luminaire is used to drive as a first set of one or more LEDs having a first spectral characteristic (i.e., light having particular spectrum of output) having a first correlated color temperature (CCT) and the second power input of the luminaire is used to drive a second set of one or more LEDs having a second spectral characteristic having a second CCT. A lighting controller (which may also be referred to as a bridge controller or virtual bridge controller) may be used to control the lighting output of one or more luminaires.

The lighting controller may be communicatively coupled to two or more DC power supplies which are then electrically connected to the two DC power inputs of one or more tunable luminaires as described above. The lighting controller may be configured to understand what DC power supplies it can control and what luminaires are coupled to the DC power supplies. This configuration may be automatically performed using standard or proprietary network discovery protocols, done manually by a user, or by a combination of automatic discovery and manual configuration.

The lighting controller may then obtain profiles for the luminaires that it is able to control. The profiles may be obtained automatically during the configuration process through retrieval from a database based on information received about the luminaires. In alternative arrangements, the profiles may be manually uploaded to the lighting controller by a person (e.g., a technician) configuring the system. In yet an alternative arrangement, the profiles may be obtained by sensing or determining the brightness and/or CCT of the luminaires. In one arrangement, the profiles provide information to the lighting controller about how much power should be provided to each DC power input of the luminaire in order to achieve a particular brightness and/or CCT for that luminaire.

At various times, the lighting controller may determine that the brightness and/or CCT for a set of (one or more) luminaires connected to a pair of DC power supplies should be changed. It can use the target brightness and/or target CCT, along with the profile for the luminaires, to determine an amount of power that the two DC power supplies should provide in order to achieve the target or desired brightness and/or the target or desired CCT. The lighting controller may then send the luminaires operational commands to the two DC power supplies to set them so that they will deliver the calculated power to the set of luminaires.

In one arrangement, the lighting controller may transmit signals to the two DC power supplies indicative of one or more changes in settings to produce changes in the light output from the luminaires at different times throughout the day, which may be referred to as one or more scenes. The lighting controller may transmit signals indicative of commands to the DC power supplies to send power, stop sending power, or change the amount of power sent, to produce one or more scenes that produce multiple changes in the light output from the luminaires at different times throughout the day.

The lighting controller may convert signals indicative of one or more changes in settings of the DC power supplies to DMX before transmitting the signals to the DC power supplies. However, it will be understood that the lighting controller may utilize other communication standards over any type of medium (e.g., wired, radio frequency, optical, and the like) for communications with the DC power supplies. In one embodiment, the lighting controller may transmit signals using UDP (User Datagram Protocol) or TCP (Transmission Control Protocol) to communicate through a wired network such as Ethernet or a wireless network such as Wi-Fi to control the output of the DC power supplies and to send power, stop sending power, or change the amount of power sent, to produce one or more scenes that produce multiple changes in the light output from the DC tunable luminaires at different times throughout the day. Some implementations may utilize Art-Net to transmit DMX information using UDP over Ethernet or some other network.

The change from a first scene, that is, a first CCT value and/or dimness/brightness for the light output of the luminaires, to a second scene, that is, a second CCT value and/or dimness/brightness for the light output of the luminaires, may be implemented as a step change or as a progressive change. In one arrangement, a step change comprises an abrupt change that occurs from one moment to the next. Alternatively, a progressive change comprises a gradual change that takes place over time. In one embodiment, the gradual change comprises a series of small step changes between the beginning of the first scene and the beginning of the second scene.

For example, for the change from an early morning scene to a sunrise scene, the lighting controller may implement a step change from a 40% dim light output at a CCT having a value of 2000K to 100% brightness at 2600K at the minute of the time occurrence of sunrise. Alternatively, the lighting controller may implement a gradual change over a time period, for example 60 seconds, to change the brightness and CCT at a rate of 1% and 10K per second to make the same amount of change at the sunrise solar event. In another embodiment, the change may take place over the entire period between events, so that if the early morning event occurs 60 minutes prior to the sunrise event, the lighting controller may change the brightness and CCT at a rate of 1% and 10K per minute to gradually change from 40% brightness at 2000K at the early morning event to 100% brightness at 2600K at sunrise.

The DC power supplies may receive the signal(s) indicative of the power changes and may send the indicated power to the first power input and second power input of the luminaires to produce the one or more scenes. The luminaires then react by emitting the light output produced by the first LED(s) driven by the first DC power input and the second LED(s) driven by the second DC power input (either one of which may be turned off for some scenes) at the time(s) of the occurrence of the predetermined solar events and/or at predetermined times assigned for the predetermined solar events.

A lighting controller may use a profile for a tunable luminaire to compile a 24-hour program to control the tunable luminaire to have a human-centric lighting output compatible with human circadian rhythms. This program can be stored in solid state memory on a controller. The controller may be separate from or embedded within the power supply powering the luminaire. Power on/off to the fixture may be controlled by a standard single or multi pole toggle switch. When the circuit is closed, the connected light fixture will produce light with the CCT and brightness as dictated by the system based on the time of day. The system can automatically adjust the CCT and brightness throughout the day for the purpose of circadian entrainment.

The system may include a graphical user interface (GUI) on a user device which allows for the solar scenes to be customized for CCT and brightness. This customization may be global for an installation or unique to lighting zones within the system. The customized programming may be compiled on the user device and transferred to the controller. The default levels may remain on the controller allowing the controller to revert back to the default levels without extensive reprogramming. The controller may have more than one set of default levels, such as constant levels that may be used before the controller is initialized, and a default human-centric cycle based on the time of day that is compatible with most people's circadian rhythm.

Certain existing circadian lighting systems are typically wireless and depend on network communication on both the local and wide area network, both reducing reliability. Certain known or existing systems offer little or no options for customization of CCT and brightness. The system disclosed herein can function normally without a network connection. A network connection is only required if a user wants to customize scenes. The automatic, easily customized scenes and the reliability that comes from a network independent system may be factors in human-centric lighting being widely adopted.

The controller may ship with a default 24-hour program and to control connected fixtures to produce light for circadian entrainment indefinitely without additional configuration or intervention. If customization is desired, the system can also allow for that. Power level profiles may be created for human centric lights and stored in a central database accessible over the internet. Software (e.g., a mobile device app) can reference these profiles and determine the correct power levels for the connected fixtures to produce light for circadian entrainment for every minute throughout the day. The software can then create a 24-hour program for CCT and brightness for the installed fixtures and transfer the program to a lighting controller. The lighting controller can run the program and send commands to power supplies to send the programmed power levels to connected light fixtures to produce light of a predetermined CCT and brightness for the time of day.

For example, FIG. 1 illustrates a block diagram of an embodiment of a lighting system 100A. The lighting system 100A includes one or more luminaires 130 each comprising a first LED having a first spectral characteristic driven by a first direct-current (DC) power input 131 and a second LED having a second spectral characteristic driven by a second DC power input 132. Embodiments of the luminaire 130 may have any number of LEDs coupled to each of the two DC power inputs 131, 132. In one preferred arrangement, this lighting system 100A and its related methods are operated to measure and control the tunable white light fixtures 130, 140 in order to produce light of predetermined brightness and color temperature.

The lighting system 100A also includes a first DC power supply 121, separate from the one or more luminaires 130, electrically coupled to the first DC power input 131 of the one or more luminaires 130 to drive the first LEDs of the one or more luminaires 130, and a second DC power supply 122, separate from the one or more luminaires 130, electrically coupled to the second DC power input 132 of the one or more luminaires 130 to drive the second LEDs of the one or more luminaires 130. The electrical coupling of the DC power supplies 121, 122 to the DC power inputs 131, 132 of the one or more luminaires 130 can be done with various types and numbers of electrical conductors and/or cables.

In some embodiments, the lighting system 100A may include a second luminaire 140 that has a third set of LEDs having a third spectral characteristic coupled to a first power input 141 of the second luminaire 140 and a fourth set of LEDs having a fourth spectral characteristic coupled to a second power input 142 of the second luminaire 140. The lighting system 100A may also include a third DC power supply 123 electrically coupled to the first DC power input 141 of the second luminaire 140 to drive the third LEDs of the second luminaire 140, and a fourth DC power supply 124 electrically coupled to the second DC power input 142 of the second luminaire 140 to drive the fourth LEDs of the second luminaire 140.

The lighting system 100A also includes a lighting controller 110, communicatively coupled to the first DC power supply 121 and the second DC power supply 122 and in some embodiments to the third DC power supply 123 and fourth DC power supply 124. The lighting controller 110 is separate from the one or more luminaires 130, 140 and may be separate from the DC power supplies 121-124. The lighting controller 110 is communicatively coupled to the DC power supplies 121-124 by a communication channel 120. As described herein in detail, the lighting controller incorporates the measurement of voltage and current during the creation of a profile for each of the coupled luminaries 130, 140. In this manner, the lighting controller creates a unique power signature for each of these light fixtures 130, 140. The power signature is then used by the lighting controller device 110 to determine the connected fixture and utilize its corresponding profile during the light fixtures' operation. In addition, as explained herein in detail, the power signature can be used by the lighting controller device 110 to monitor the connected fixture to determine whether the connected fixture is experiencing an undesired operating state such as power signature drift (i.e., trending away from its characteristic power signature), a failure of the connected fixture, a malfunction of the connected fixture and/or other type of undesired operating state.

The communication channel 120 can be any appropriate set of unidirectional or bidirectional point-to-point communication links between the lighting controller 110 and the power supplies 121-124, including individual direct links to each power supply 121-124 from the lighting controller 110, a hierarchical tree connection channel such as USB, or a daisy-chained communication link such as DMX. The communication channel may comprise a bus or network over a wired or wireless media such as, but not limited to, DALI, Ethernet, Wi-Fi, the internet, a mobile telephony network (e.g. a 3G/4G/5G network), and/or Bluetooth.

The lighting controller 110 may comprise a dedicated device, purpose-built to be a lighting controller, which may be referred to as a bridge controller as it provides a bridge from a user to the DC power supplies 121-124 used to control the luminaires 130, 140. In some embodiments, the lighting controller 110 may utilize a general-purpose computing device, such as a computer or a server, running software to implement the functionality of the lighting controller 110, which may be referred to as a virtual bridge controller. The lighting controller 110 may be located in the same building as the luminaires 130, 140 and be directly wired to the DC power supplies 121-124, but in some embodiments the lighting controller 110 may utilize a remote server, such as a cloud server, and communicate with the user 150 and the DC power supplies 121-124 over the internet.

The lighting controller 110 includes a processor or CPU 111 which can be any type of computing device, including, but not limited to, a 32-bit or 64-bit central processing unit (CPU) from Intel or AMD having one or more X86 architecture cores, an embedded ARM® architecture CPU with one or more cores, an 8-bit 8051 architecture processor core, a 32-bit Coldfire processor core, a RISC-V processor core, or any other processor core using any reduced instruction set computer (RISC) or complex instruction set computer (CISC) instruction set architecture having any instruction bit length. The processor 111 may also be implemented in a field-programmable gate array (FPGA) in some embodiments or using an application-specific integrated circuit (ASIC).

The lighting controller further comprises one or more memory devices 115, such as a dynamic random-access memory (DRAM) and/or a non-volatile flash memory device, coupled to the processor 111, which can store instructions 117 for the processor 111 to perform any method disclosed herein. In some embodiments, the one or more memory devices 115 may include a user-removeable memory device, such as a Secure Digital (SD) Card or a USB drive.

The processor may be operated so as to allow the lighting controller 110 to measure the brightness and color temperature properties of the warm channel and the cool channel of tunable white light fixtures 130, 140. The processor may also be operated so to measure the voltage and current during creation of a profile and can therefore monitor the operating state of the light fixtures 130, 140. As an example, this involves gradually increasing power outputs of the lighting controller 110 with a plurality of power outputs. In one arrangement, these measuring steps may begin with the lighting controller 110 applying a minimum power application. As the applied power is advanced (i.e., advanced incrementally), the voltage and current are recorded at each power level.

For example, in one preferred arrangement, the profile comprises multiple resulting voltage measurements at one or more target current values. As just one example, the resulting voltage may be that voltage that is required for the fixture to draw at the following target values of 1 mA, 10 mA, 50 mA, and 100 mA. In such an arrangement, when the resulting voltage values and the targeted current values intersect one another with a specific result, this intersection may be referred to as a system or method operational point. The various resulting voltages, target currents, and operational points may be stored for future retrieval. For example, this data may be stored in the memory 115 of the lighting controller or separately in the database 119.

Based on this measured information, the CPU may be operated so as to determine a power signature. That is, as the power outputs are gradually increased, the lighting controller 110 monitors the current draw of the light fixtures 130, 140. When the fixture's current draw measures a desired current, such as a desired current of one milliamp for example, the corresponding value is determined and recorded as the power signature for that specific fixture. As those of ordinary skill in the art will recognize, other fixtures within the lighting device system 100A may then also have its power signature measured in a similar manner.

In one arrangement, the lighting controller 110 comprises a power supply control interface 113 and may optionally include a network interface 112, each coupled to the processor 111. In some embodiments, the power supply control interface 113 and the network interface 112 may be one and the same (e.g., an Ethernet interface), but in other embodiments, they may be separate interfaces (e.g., a DMX interface for the power supply control interface 113 and a Wi-Fi interface for the network interface 112). The power supply control interface 113 provides an interface to the communication link 120 used for communication with the power supplies 121-124 while the network interface 112 provides an interface to connections used to communicate with control devices such as the remote control 153 and/or the wall switch 157, as well as other electronic devices which may be used to configure and/or control the lighting system 100A.

The network interface 112 may also provide the lighting controller 110 with access to the internet. In one preferred arrangement, the wall switch 157 might not be a traditional 120 VAC switch but may simply be a device which reports the position of a switch (e.g. open or closed, or a brightness level based on a slider or knob) to the lighting controller through the network interface 112 and may not directly control any current flow to the one or more luminaires 130, 140.

In some embodiments, the network interface 112 may be used to communicate with the database 119, but other embodiments of the lighting controller 110 may have a dedicated interface for the database 119, such as serial attached storage interface (SATA) or small-computer serial interface (SCSI). The power supply control interface 113 and the network interface 112 can be interfaces to any appropriate communications link, including, but not limited to, DMX, DALI, Ethernet, and Wi-Fi.

The lighting controller 110 is configured to obtain a target CCT for the one or more luminaires 130, 140 and obtain a profile for the luminaire 130. The target CCT may be obtained from a user 150 using a remote control 153, a pre-defined scene associated with a solar event or a time, or from any other source. Predefined scenes, solar events, and/or times, may be stored in the memory 115, in the database 119, in a cloud server accessible over the internet, or in any other location. The profile may be stored in memory 115 or may be obtained from a database 119 based on information about the luminaire, such as a model number. The database may be embedded in the lighting controller 110, may be local with a direct connection to the lighting controller 110, or may be remote, such as being hosted by a cloud server or a web server accessible to the lighting controller 110 over the internet. In other embodiments, the profile may be provided by a technician during a configuration of the lighting system 100A.

In one arrangement, the lighting controller 110 creates a profile and a power signature. That is the profile, which includes the power signature as previously computed, is created using the measured brightness, color temperature properties, and the determined power signature. In this profile and power signature arrangement, this profile represents the power settings required to mix the output of the warm and cool channels of the tunable white light fixtures 130, 140 so as to produce light of the desired brightness and color temperature.

In one preferred arrangement, the lighting controller 110 is further configured to calculate a first target power for the first DC power input 131 of the luminaire 130 and a second target power for a second DC power input 132 of the luminaire 130 based on the target CCT and the profile. The first target power and the second target power are calculated to drive the luminaire 130 to emit light at the target CCT. The lighting controller 130 is also configured to control the first DC power supply 121 to deliver the first target power to the first DC power input 131 of the luminaire 130 and the second DC power supply 122 to deliver the second target power to the second DC power input 132 of the luminaire 130. The lighting controller 110 can control the DC power supplies 121, 122 by sending commands over the communication link 120 to the DC power supplies 121, 122.

In embodiments that include the second luminaire 140 driven by the third and fourth DC power supplies 123, 124, the lighting controller 110 is configured to obtain a second profile, different than the first profile, for the second luminaire 140 and to calculate a third target power for a first DC power input 141 of the second luminaire 140 and a fourth target power for a second DC power input 142 of the second luminaire 140 based on the target CCT and the second profile. The third target power and the fourth target power are calculated to drive the second luminaire 140 to emit light at the target CCT.

Note that because the first luminaire 130 may have different characteristics than the second luminaire 140, the first and second target power may be different than the third and fourth target power but still allow both the first luminaire 130 and the second luminaire 140 to emit light at the target CCT and brightness. Once the third power target and the fourth power target have been calculated, the lighting controller 110 may be configured to control the third DC power supply 123 to deliver the third target power to the first DC power input 141 of the second luminaire 140 and a fourth DC power supply 124 to deliver the fourth target power to the second DC power input 142 of the second luminaire 140.

Note that the lighting controller 110 may be able to fully function without the use of the network interface 112 by using default scenes built into the controller 110 and stored in the memory 115. Thus, embodiments without a network interface 112 are possible. Some embodiments may function in a default mode but still include a network interface 112 to allow a user 150 to optionally customize its scenes.

In one aspect of the present disclosure, during a profile creation process as herein described in detail, the system (such as the system 100A illustrated in FIG. 1) measures the voltage and current while gradually turning up the power outputs of the device with multiple power outputs. In one preferred arrangement, the power outputs start at the minimum power and increase until the fixture starts to draw current. Once the fixture's current draw measures a targeted value, such as one milliamp, the corresponding or resulting voltage is recorded as the power signature for that particular fixture.

As just one example, the profile may consist of multiple voltage measurements at target currents. For example, the voltage required for the fixture to draw 1 mA, 10 mA, 50 mA, and 100 mA. In one arrangement, when the resulting voltage and current intersect with a specific result this can be referred to as an "operational point." Other power signatures for other fixtures within a given lighting system may be generated as well. In one preferred arrangement, these power signatures may then be stored in a searchable database or memory device, such as a memory device within a lighting controller (i.e., see FIG. 1 lighting controller 110).

Once the power signature is determined for a specific fixture, the lighting controller device with multiple power outputs 110 utilizes the power signature to identify the connected fixture. In addition, the power signature may be used to monitor the operational state of the specific fixture. In one arrangement, a lighting system 100A compares the measured power signature with the stored signatures of known fixtures, and upon finding a match, determines the corresponding fixture and retrieves its profile. In one arrangement, a lighting system 100A can then determine what the expected power signature for this specific lighting device should be and can then determine if the lighting device's current measured or monitored power signature is within an acceptable range of its expected operational features as defined as the device's original power signature. That is, is the device experiencing some type of undesired operational state, such as experiencing a power signature degradation that will reduce the overall efficiency, brightness, or other operational characteristic that represents an undesired lighting device output.

During operation, the lighting controller device 110 utilizes the identified fixture's profile to set the power levels required to produce light of the desired brightness and color temperature in the lighting devices, such as lighting devices 130 and 140 illustrated in FIG. 1. As just one example, the lighting controller device 110 utilizes the identified fixture's profile to set the power levels required to produce light of the desired brightness and color temperature according to the active scene. The power levels are controlled based on the profile's specifications and any adjustments made by a user input. As just one example, such user input may be provided by way of the user 150, the remote control 153, or the switch 157 illustrated in FIG. 1.

The system 100A further encompasses other features, such as providing information for scenes with static brightness and color temperature levels, a circadian scene with varying levels throughout the day, as well as other dynamic scenes desired by the user.

In one arrangement, the present disclosure reinforces the aspect of utilizing the power signature to determine the connected fixture and dynamically utilize its corresponding profile during operation. This helps to ensure accurate control of the power levels and enables personalized lighting experiences tailored to the specific fixture and user preferences. In one arrangement, the present disclosure reinforces the aspect of utilizing the power signature to monitor the connected fixture and dynamically analyze its corresponding profile during operation to determine whether the connected fixture is operating as intended and therefore whether the connected fixture is experiencing an undesired operational state.

The present disclosure adds an innovative aspect to the existing system for measuring, controlling and/or monitoring tunable white light fixtures. By utilizing the power signature to determine the connected fixture, dynamically utilize its profile during operation, and also monitor its operating parameters, the system helps to ensure accurate control of the power levels and enhances the personalized lighting experiences. Users can enjoy the benefits of precise control and customization provided by the systems and methods disclosed herein.

Figure 2:
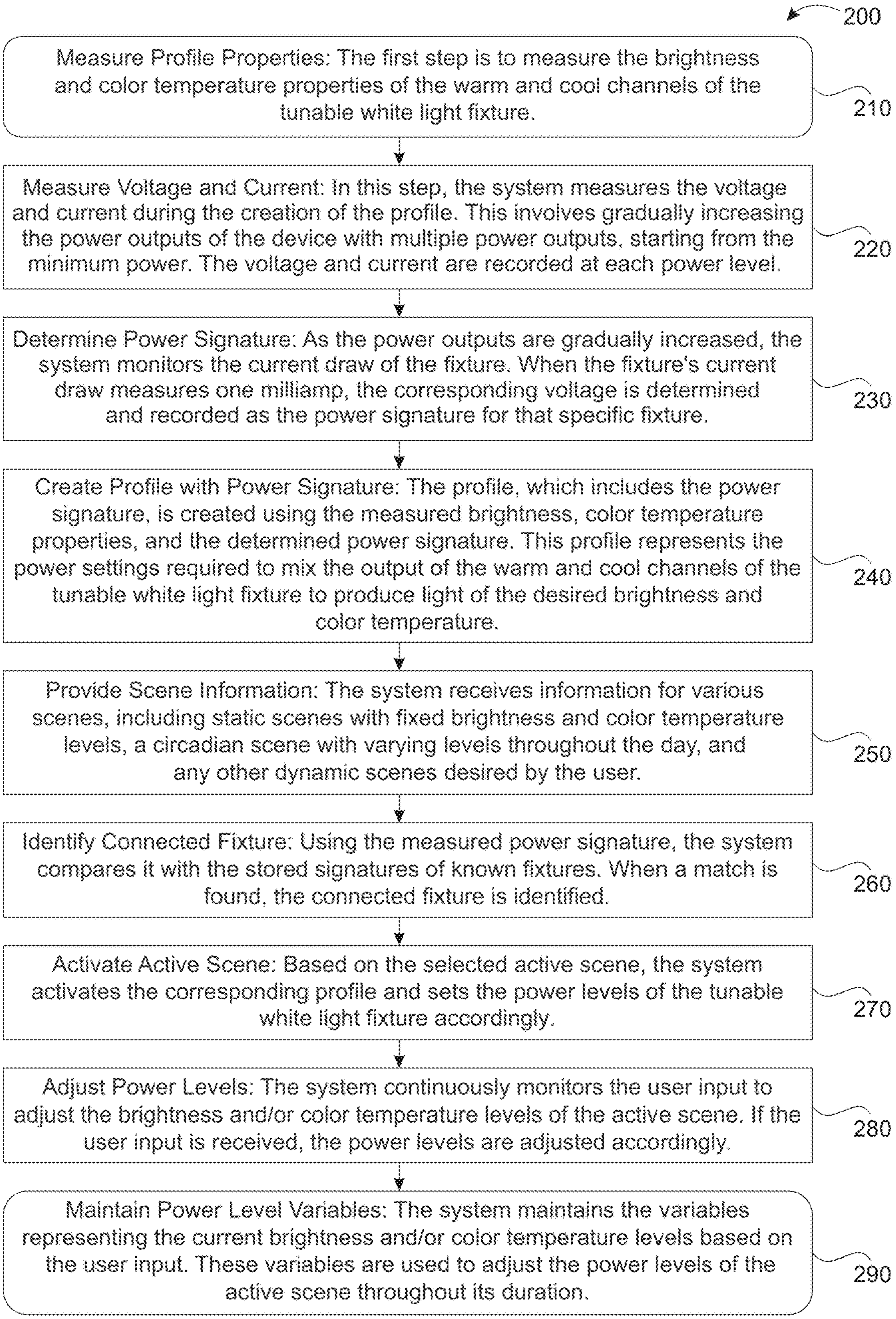
FIG. 2 illustrates an exemplary method of utilizing a lighting controller for use with a lighting system, such as the lighting system illustrated in FIG. 1.

FIG. 2 illustrates a method 200 of generating a power signature for use in a lighting system, such as the lighting system illustrated in FIG. 1. For example, the method 200 begins at an initial step 210 which is directed to measuring profile properties. For example, during this process step 210, the system or methods measure the brightness and color temperature properties of the warm channel and the cool channel of a tunable white light fixture, such as the tunable white light fixtures illustrated in FIG. 1.

The method 200 then proceeds to the next step 220 directed to measuring voltage and current. As just one example, during this process step, the system measures the voltage and current during creation of a profile. As an example, this involves gradually increasing power outputs of the device with a plurality of power outputs, such as the lighting controller 110 illustrated in FIG. 1. In one arrangement, these measuring steps may begin with the lighting controller 110 applying a minimum power application. As the applied power is advanced (i.e., advanced incrementally), the voltage and current are recorded at each power level. For example, in one preferred arrangement, the profile comprises multiple resulting voltage measurements at one or more target current values. As just one example, the resulting voltage may be that voltage that is required for the fixture to draw at the following target values of 1 mA, 10 mA, 50 mA, and 100 mA. In such an arrangement, when the resulting voltage values and the targeted current values intersect one another with a specific result, this intersection may be referred to as a system or method operational point.

The method 200 then proceeds to the next step 230 directed to determining a power signature. During this method step 230, the system determines a power signature. That is, as the power outputs are gradually increased, the system monitors the current draw of the light fixture. When the fixture's current draw measures a desired current, such as a desired current of one milliamp for example, the corresponding value is determined and recorded as the power signature for that specific fixture. As those of ordinary skill in the art will recognize, other fixtures within the lighting device system (such as the lighting device system illustrated in FIG. 1) may then also have its power signature measured in a similar manner.

The method 200 then proceeds to the next step 240 directed to creating a profile and a power signature. That is the profile, which includes the power signature, is created using the measured brightness, color temperature properties, and the determined power signature. This profile represents the power settings required to mix the output of the warm and cool channels of the tunable white light fixture to produce light of the desired brightness and color temperature.

The method 200 then proceeds to the next step 250 directed to providing scene information. For example, at this method step 250, the system and method receive information for various scenes, such scenes may include static scenes with fixed brightness and color temperature levels. The systems and methods may also receive a circadian scene with varying levels throughout a given time period, such as a day. It may also receive other dynamic scenes desired by the user and as described in detail herein.

The method 200 then proceeds to the next step 260 directed to providing connected fixture identification. For example, at method step 260 the systems and methods will utilize the measured power signature and will compare it with the stored signatures of known fixtures. As described in detail herein, such a power signature may be stored in the lighting controller 110 (i.e., the memory 115). When a match is found, the connected fixture is identified.

The method 200 then proceeds to the next step 270 directed to activating an active scene. For example, based on the selected active scene, the system activates the corresponding profile and sets the power levels of the tunable white light fixture accordingly.

The method 200 then proceeds to the next step 280 directed to adjusting power levels. The example, at step 280, the system and method will continuously monitor the user input to adjust the brightness and/or the color temperature levels of the active scene. If the user input is received, the power levels will be adjusted accordingly.

The method 200 then proceeds to the next step 290 directed to maintaining power levels. For example, at step 290, the system and method will maintain the variables representing the current brightness and/or color temperature levels based on the user input. These variables are used to adjust the power levels of the active scene throughout its duration.

Figure 3:
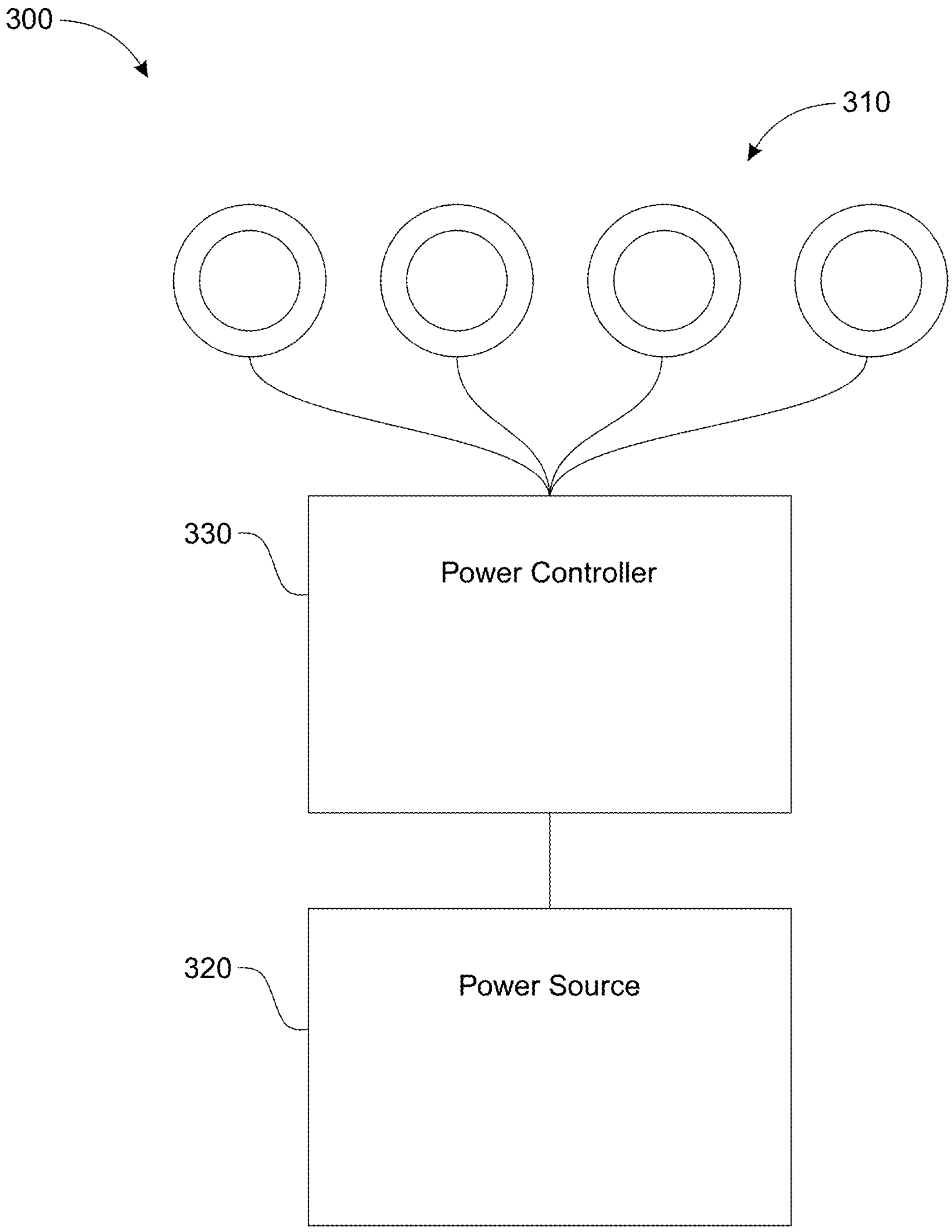
FIG. 3 illustrates another block diagram of an embodiment of a lighting system incorporating aspects of the present disclosure.

As noted herein, the present disclosure also provides a method and system for monitoring, detecting and reporting the failure or malfunction of LED fixtures in a lighting system. For example, FIG. 3 is a schematic diagram illustrating an embodiment of a lighting system 300 according to an arrangement. This lighting system 300 operates in a similar manner as the lighting system 100A illustrated in FIG. 1 and herein described in detail. As illustrated in FIG. 3, the lighting system 300 includes a plurality of LED fixtures 310, a power source 320, and a lighting or power controller 330. The lighting controller 330 is configured to apply power to the LED fixtures, measure their voltage and current, and record a resulting voltage to define a power signature for each fixture contained in the plurality of fixtures 310.

Referring to FIG. 3, a lighting system 300 according to an embodiment of an arrangement is shown. The lighting system 300 includes multiple LED fixtures 310, a power supply 320, and a lighting controller 330. The lighting controller 330 is configured to apply power to the LED fixtures 310, measure their voltage and current, and record a resulting voltage to define a power signature for each fixture. As described in detail herein, the power signature of a fixture is a unique characteristic that can be used to identify the fixture and monitor its performance. In one embodiment, the power signature is defined based on the voltage and current of the fixture when it substantially achieves a target current.

In one arrangement, each light fixture within the plurality of light fixtures 310 comprises a first LED having a first spectral characteristic driven by a first direct-current (DC) power input and a second LED having a second spectral characteristic driven by a second DC power input.

As described herein in detail, the lighting controller 330 incorporates the measurement of voltage and current during the creation of a profile for each of the plurality of lighting fixtures 310. In this manner, the lighting controller 330 creates a unique power signature for each of the light fixtures. The power signature is then used by the lighting controller 330 to determine or confirm the connected fixture and utilize its corresponding profile during the light fixtures' operation. In addition, as explained herein in detail, the power signature can be used by the lighting controller 330 to monitor the connected fixtures to determine whether the connected fixtures are experiencing an undesired operating state such as power signature drift (i.e., trending away from its characteristic power signature), a failure of the connected fixture, and/or a malfunction of the connected fixture.

In one arrangement, the lighting or power controller 330 comprises a processor wherein the processor may be operated so as to allow the lighting controller 330 to measure the brightness and color temperature properties of the warm channel and the cool channel of the tunable light fixtures 310. The processor may also be operated so to measure the voltage and current during creation of a profile.

For example, in one preferred arrangement, the profile comprises multiple resulting voltage measurements at one or more target current values. As just one example, the resulting voltage may be that voltage that is required for the fixture to draw at the following target values of 1 mA, 10 mA, 50 mA, and 100 mA. In such an arrangement, when the resulting voltage values and the targeted current values intersect one another with a specific result, this intersection may be referred to as a system or method operational point. The various resulting voltages, target currents, and operational points may be stored for future retrieval. For example, this data may be stored in a memory of the lighting controller or separately in a database.

Based on this measured information, the processor may be operated so as to determine a power signature. That is, as the power outputs are gradually increased, the lighting controller 330 monitors the current draw of the light fixtures 310. When the fixture's current draw measures a desired current, such as a desired current of one milliamp for example, the corresponding value is determined and recorded as the power signature for that specific fixture. As those of ordinary skill in the art will recognize, other fixtures within the lighting device system 300 may also have its power signature measured in a similar manner.

In one arrangement, the lighting controller 330 creates a profile and a power signature for each light fixture. That is the profile, which includes the power signature as herein described, is created using the measured brightness, color temperature properties, and the determined power signature. In this profile and power signature arrangement, this profile represents the power settings required to mix the output of the warm and cool channels of the tunable white light fixtures 310 so as to produce light of the desired brightness and color temperature.

Once the power signature is determined for a specific fixture, the lighting controller device with multiple power outputs utilizes the power signature to identify the connected fixture while this power signature may also be utilized so as to monitor an operational state of the specific fixture. In one arrangement, a lighting system 300 compares the measured power signature with the stored signatures of known fixtures, and upon finding a match, determines the corresponding fixture and retrieves its profile.

In one arrangement, a lighting system 300 can then determine what the expected power signature for this specific lighting device should be. Therefore, the lighting system 300 can then determine if the lighting device's current measured or monitored power signature is within an acceptable range of its expected operational features as defined by the device's original power signature. That is, is the device experiencing some type of power signature degradation that will reduce the overall efficiency, brightness, and/or other operational characteristic that represents an undesired lighting device output.

Figure 4:
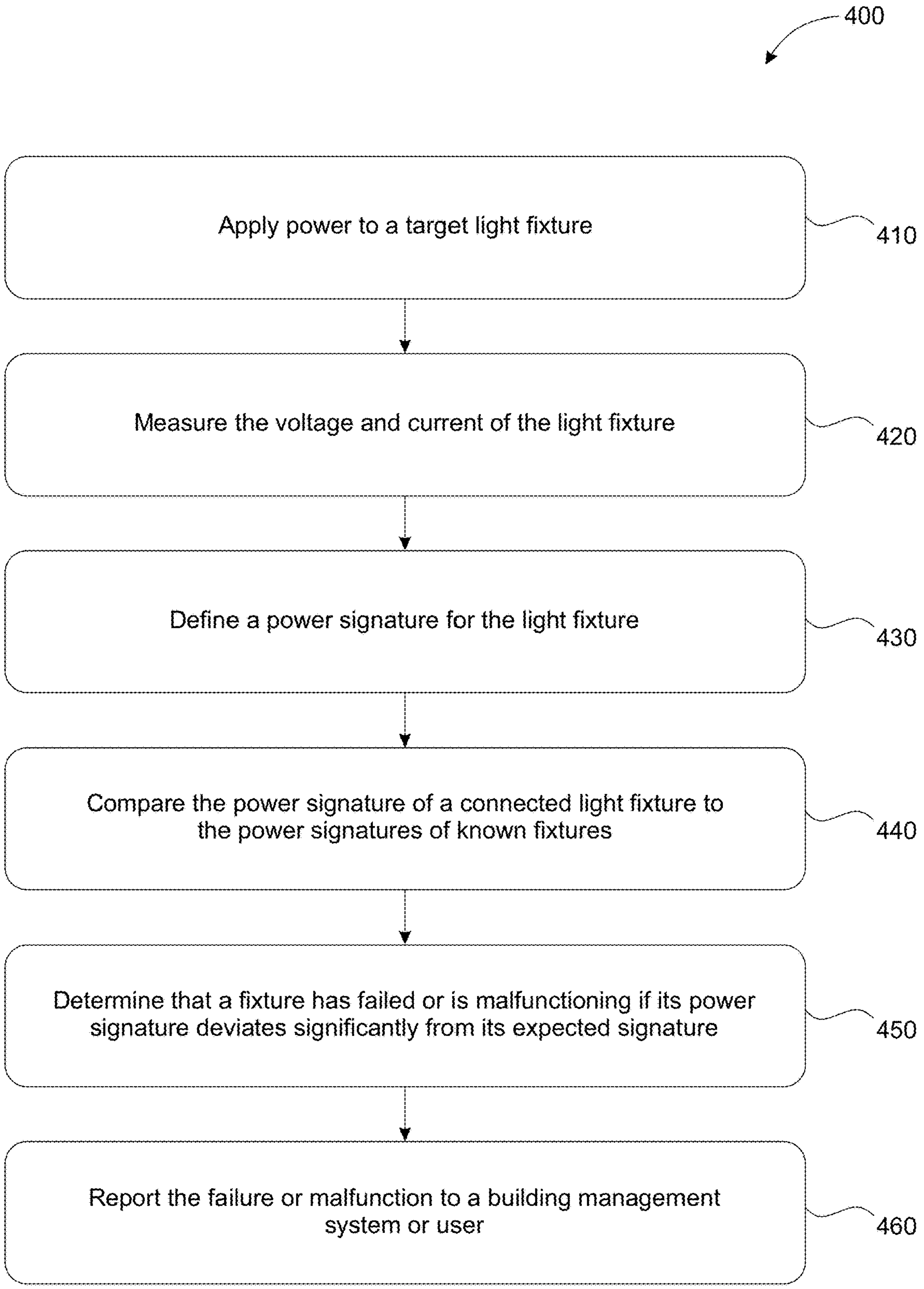
FIG. 4 illustrates an exemplary method of utilizing a lighting controller for use with a lighting system, such as the lighting system illustrated in FIG. 1.

FIG. 4 illustrates a method 400 of monitoring a lighting device for use in a lighting system, such as the lighting systems illustrated in FIGS. 1 and 3. The method involves comparing the power signature of a connected light fixture to the power signatures of known fixtures, determining that a fixture has failed or is malfunctioning if its power signature deviates from its expected signature, and reporting the failure or malfunction to a building management system or user. The system includes multiple LED fixtures, a power supply, and a lighting controller configured to carry out the method, similar to the systems illustrated in FIGS. 1 and 3. The present disclosure enables proactive maintenance, improves the reliability of lighting systems, and enhances the safety and productivity of environments illuminated by these systems.

For example, the method 400 begins at an initial step 410 which is directed to applying power to a target light fixture, such as the light fixtures illustrated in FIGS. 1 and 3. In such a method of monitoring, in one preferred arrangement, the method has already determined an initial power signature of a lighting device in accordance to a preferred method of power signature creation, such as the illustrative method 200 in FIG. 2.

Then, the process 400 proceeds to step 420 which includes the step of measuring profile properties as herein described. For example, during this process step 420, the system or methods measure the brightness and color temperature properties of the warm channel and the cool channel of a tunable white light fixture, such as the light fixtures illustrated in FIGS. 1 and 3.

The method 400 at step 420 is also directed to measuring voltage and current. As just one example, during this process step 420, the system measures the voltage and current during creation of a profile. As an example, this involves gradually increasing power outputs of the device with a plurality of power outputs, such as the lighting controllers illustrated in FIGS. 1 and 3. In one arrangement, these measuring steps may begin with the lighting controller applying a minimum power application.

As the applied power is advanced (i.e., advanced incrementally), the voltage and current are recorded at each power level. For example, in one preferred arrangement, the profile comprises multiple resulting voltage measurements at one or more target current values. As just one example, the resulting voltage may be that voltage that is required for the fixture to draw at the following target values of 1 mA, 10 mA, 50 mA, and 100 mA. In such an arrangement, when the resulting voltage values and the targeted current values intersect one another with a specific result, this intersection may be referred to as a system or method operational point.

The method 400 then proceeds to the next step 430. At step 430, the method 400 then proceeds to create a profile and a subsequent power signature. During this method step 430, the system defines a subsequent power signature. That is, a subsequent power signature is one after the initial or original power signature of the lighting fixture has been measure and identified. Returning to the method step 430, as the power outputs are gradually increased, the system monitors the current draw of the light fixture. When the fixture's current draw measures a desired current, such as a desired current of one milliamp for example, the corresponding value is determined and recorded as the power signature for that specific fixture. As those of ordinary skill in the art will recognize, other fixtures within the lighting device system (such as the lighting device systems illustrated in FIGS. 1 and 3) may then also have their power signatures measured in a similar manner.

That is the profile, which includes what is now the subsequent power signature, is created using the measured brightness, color temperature properties, and the determined subsequent power signature. This profile represents the power settings required to mix the output of the warm and cool channels of the tunable white light fixture to produce light of the desired brightness and color temperature. As described in detail herein, such a power signature may be stored in the lighting controller (i.e., the memory contained within the lighting controller). When a match is found, the connected fixture is identified based in part on its measured power signature.

The method 400 then proceeds to the next step 440 directed to providing connected fixture identification. For example, at method step 440 the systems and methods will utilize the measured subsequent power signature and will compare it with the stored power signatures of this known fixture. As described in detail herein, such stored power signatures may be stored in the lighting controller 110 (i.e., the memory 115). When a match is found, the connected fixture is identified.

The method 400 for monitoring the LED fixture in a lighting system proceeds to the step of comparing the power signature of a connected light fixture to the power signatures of known fixtures (step 440). After this comparing step, the method will then proceed to step 450 wherein the method determines whether the fixture has failed or is malfunctioning if its power signature deviates from its expected power signature.

In one arrangement, the method step 450 determines if the lighting device is experiencing an undesired operating state by comparing the recently measured power signature to the known power signature of the lighting device. If it is determined that the lighting device is experiencing an undesired operating state, the method 400 will proceed to step 460 which involves reporting the failure or malfunction to a building management system or user. The failure or malfunction of a fixture can be reported in various ways. For example, a notification can be sent via a network, a warning can be displayed on a user interface, or an alarm can be triggered.

Figure 5A:
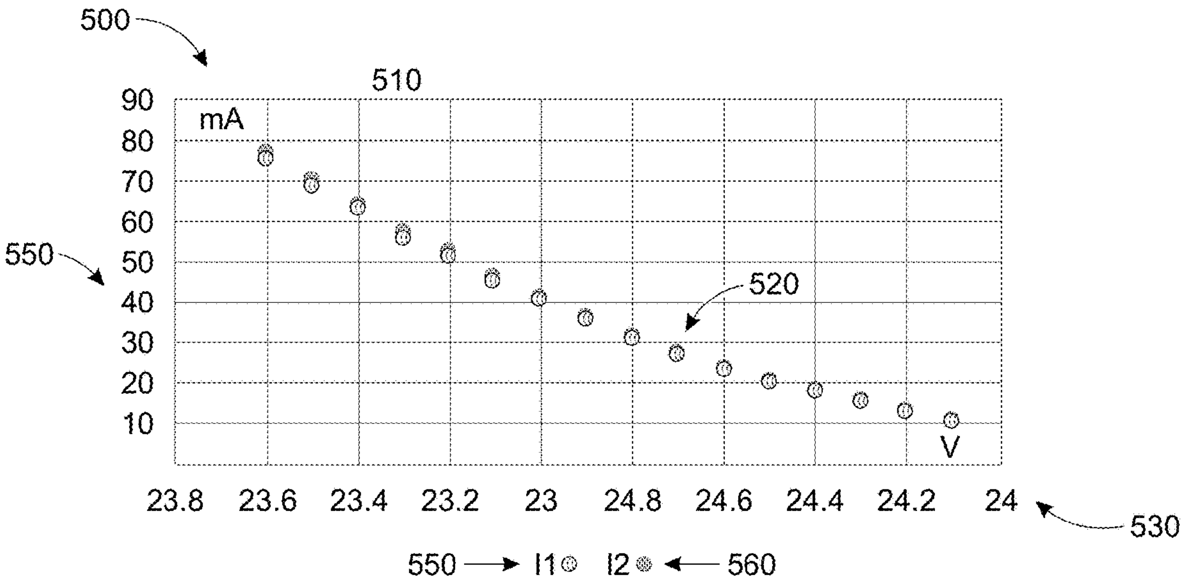
FIG. 5A illustrates a graphical illustration of a lighting device operating in a desired operating state.

FIG. 5A is a graphical representation 500 illustrating an example of a power signature 520 for a healthy LED fixture. That is, an LED fixture that is operating in accordance to a desired operational state. As illustrated in FIG. 5A, the LED fixture in this example illustration comprises a Lithonia WF6 light fixture. And as illustrated, the graphical representation 500 represents the voltage (volts) 530 as the independent variable (along the x-axis) and the resulting current (mA) 550 as the dependent variable (along the y-axis). In this illustrated arrangement, the LED fixture comprises two channels, for example, one channel of cool white LEDs and at least one channel of warm white LEDs. The lighting controller can then adjust the first current I1 560 flowing through the first channel and the second current I2 570 flowing through the second channel so as to adjust the overall brightness of the LED fixture. As illustrated in FIG. 5A, the first current I1 560 flowing through the first channel is very similar to the second current I2 570 flowing through the second channel.

Figure 5B:
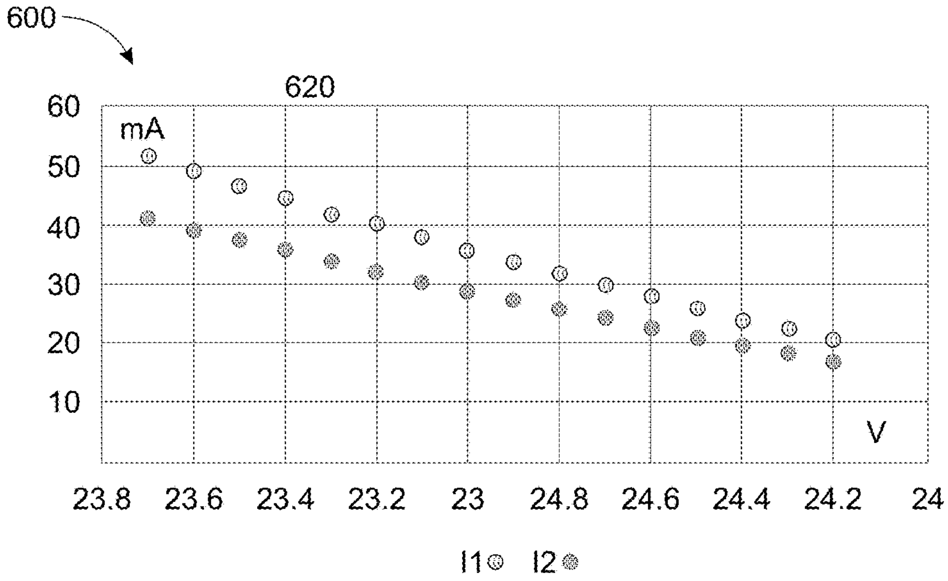
FIG. 5B illustrates a graphical illustration of a lighting device operating in an undesired operating state.

FIG. 5B is a graphical representation 600 illustrating an example of a power signature 620 for a failed or malfunctioning LED fixture according to the present invention. That is, an LED fixture experiencing an undesired operational state. The power signature is represented by a plot of current versus voltage. As can be seen from comparing the voltage and current values between FIGS. 5A and 5B, the power signature of the failed or malfunctioning fixture as represented by the values in FIG. 5B deviates significantly from the power signature of the healthy fixture, indicating a failure or malfunction as represented by the values in FIG. 5A. As illustrated, the LED fixture has experienced a power signature drift whereby the current and voltage values have undergone a significant drift from the original values as illustrated in FIG. 5A. For example, in this illustrated arrangement, the lighting fixture has undergone a separation between I1 550 and I2 560 values.

In one arrangement, the disclosed methods and systems provide a reliable and efficient way of detecting and reporting the failure or malfunction of LED fixtures in a lighting system. This enables proactive maintenance, improves the reliability of lighting systems, and enhances the safety and productivity of environments illuminated by these systems.

The description of the different advantageous embodiments has been presented for purposes of illustration and description and is not intended to be exhaustive or limited to the embodiments in the form disclosed. Modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

We claim:

1. A method of operating a lighting system, the method comprising:

measuring, under control of a lighting controller in the lighting system, two or more voltage/current operating points of a light fixture at a first time to generate a first power signature for the light fixture;

obtaining a plurality of power signatures at the lighting controller, wherein a power signature of the plurality of power signatures comprises two or more target voltage/current operating points for a type of light fixture;

selecting, by the lighting controller, a target power signature from the plurality of power signatures for the light fixture by comparing the first power signature of the light fixture to one or more power signatures of the plurality of power signatures;

measuring, under control of the lighting controller in the lighting system, one or more voltage/current operating points of the light fixture at a second time, after the first time, to generate a second power signature for the light fixture;

comparing, by the lighting controller, the second power signature of the light fixture to the target power signature; and determining, by the lighting controller, that the light fixture has experienced an undesired operating state based on the second power signature of the light fixture deviating from the target power signature.

2. The method of claim 1 further comprising reporting the undesired operating state of the light fixture by sending a message over a network.

3. The method of claim 2 wherein the message is sent to a building management system.

4. The method of claim 1 further comprising reporting the undesired operating state of the light fixture by displaying a warning on a user interface.

5. The method of claim 1 further comprising reporting the undesired operating state of the light fixture by triggering an alarm.

6. The method of claim 1, wherein the undesired operating state comprises a failure of the light fixture.

7. The method of claim 1, wherein the undesired operating state comprises a malfunction of the light fixture.

8. The method of claim 1, wherein the plurality of power signatures are stored in a memory device and obtained by reading the plurality of power signatures from the memory device.

9. The method of claim 1, wherein the plurality of power signatures are stored in a database accessible over a network and obtained by accessing the database over the network.

10. The method of claim 1, wherein a power signature of the plurality of power signatures comprises two or more voltage/current operating points for a first power input of a respective light fixture of a plurality of light fixtures and two or more voltage/current operating points for a second power input of the respective light fixture of the plurality of light fixtures; and the first power signature and the second power signature each comprise two or more voltage/current operating points for a first power input of the light fixture and two or more voltage/current operating points for a second power input of the light fixture.

11. A lighting controller comprising:

a power supply interface;

a processor, coupled to the power supply interface;

a memory, coupled to the processor, and storing instructions that when executed by the processor, cause the lighting controller to perform a method comprising:

measuring two or more voltage/current operating points of a light fixture at a first time to generate a first power signature for the light fixture, wherein the light fixture is powered by at least one power supply coupled to the power supply interface;

obtaining a plurality of power signatures wherein a power signature of the plurality of power signatures comprises two or more target voltage/current operating points for a type of light fixture;

selecting a target power signature from the plurality of power signatures for the light fixture by comparing the first power signature of the light fixture to one or more power signatures of the plurality of power signatures;

measuring one or more voltage/current operating points of the light fixture at a second time, after the first time, to generate a second power signature for the light fixture;

comparing the second power signature of the light fixture to the target power signature; and determining that the light fixture has experienced an undesired operating state based on the second power signature of the light fixture deviating from the target power signature.

12. The lighting controller of claim 11, further comprising a network interface coupled to the processor, the method further comprising reporting the undesired operating state of the light fixture by sending a message through the network interface over a network.

13. The lighting controller of claim 12, wherein the message is sent to a building management system.

14. The lighting controller of claim 11, the method further comprising reporting the undesired operating state of the light fixture by displaying a warning on a user interface.

15. The lighting controller of claim 11, the method further comprising reporting the undesired operating state of the light fixture by triggering an alarm.

16. The lighting controller of claim 11, wherein the undesired operating state comprises a failure of the light fixture.

17. The lighting controller of claim 11, wherein the undesired operating state comprises a malfunction of the light fixture.

18. The lighting controller of claim 11, wherein the plurality of power signatures are stored in the memory and obtained by reading the plurality of power signatures from the memory.

19. The lighting controller of claim 11, further comprising a network interface coupled to the processor, wherein the plurality of power signatures are stored in a database and obtained by accessing the database through the network interface.

20. The lighting controller of claim 11, wherein a power signature of the plurality of power signatures comprises two or more voltage/current operating points for a first power input of a respective light fixture of a plurality of light fixtures and two or more voltage/current operating points for a second power input of the respective light fixture of the plurality of light fixtures; and the first power signature and the second power signature each comprise two or more voltage/current operating points for a first power input of the light fixture and two or more voltage/current operating points for a second power input of the light fixture.

* * * * *